United States Patent [19]

Singh et al.

[11] Patent Number: 5,563,730

[45] Date of Patent: Oct. 8, 1996

[54] THALLIUM ARSENIC SULFIDE CRYSTALS ($Tl_3AsS_3$) HIGH EFFICIENCY NONLINEAR OPTICAL APPLICATIONS

[75] Inventors: Narsingh B. Singh, Export; James P. McHugh, Wilkins Township; Emmanuel P. Supertzi, Pittsburgh; Tom Henningsen, Monroeville; Richard P. Storrick, East McKeesport; Robert Mazelsky, Monroeville, all of Pa.

[73] Assignee: Northrop Grumman Corporation, Los Angeles, Calif.

[21] Appl. No.: 264,129

[22] Filed: Jun. 21, 1994

Related U.S. Application Data

[63] Continuation-in-part of Ser. No. 165,290, Dec. 13, 1993, Pat. No. 5,510,929, and a continuation-in-part of Ser. No. 165,291, Dec. 13, 1993, Pat. No. 5,504,615.

[51] Int. Cl.⁶ ........................................ G02F 1/00
[52] U.S. Cl. ...................... 359/321; 359/327; 359/328
[58] Field of Search .................................. 359/321, 327, 359/328

[56] References Cited

U.S. PATENT DOCUMENTS

| | | | |
|---|---|---|---|
| 3,733,499 | 5/1973 | Deis et al. | 310/4 |
| 3,792,287 | 2/1974 | Roland et al. | 307/88.3 |
| 3,799,659 | 3/1974 | Roland et al. | 350/321 |
| 3,915,556 | 11/1975 | Roland et al. | 350/161 |
| 3,985,863 | 5/1976 | Isaacs et al. | 350/161 |
| 4,955,699 | 9/1990 | Singh et al. | 350/353 |

OTHER PUBLICATIONS

Singh, N. B., et al. "Growth And Characterization Of Thallium Arsenic Selenide Crystals For Nonlinear Optical Applications", *Progressive Crystal Growth and Characteristics*, vol. 20 pp. 175–188, 1990.

Feichner, J. D. and Roland, G. W., "Optical Properties of a New Nonlinear Optical Material: $Tl_3AsSe_3$", *Applied Optics*, vol. II, No. 5, May, 1972.

*Primary Examiner*—Georgia Y. Epps
*Assistant Examiner*—Thomas Robbins
*Attorney, Agent, or Firm*—Phillip A. Florenzo

[57] ABSTRACT

Crystals formed of $Tl_3AsS_3$ provide very good materials for the nonlinear optical conversion efficiency. The crystals are useful in nonlinear optical devices such as harmonic generators and optical parametric oscillators, and in linear applications such as acousto-optical devices. The method of preparing such crystals is also disclosed.

6 Claims, 3 Drawing Sheets

THALLIUM ARSENIC SULFIDE CRYSTALS (Tl$_3$AsS$_3$) HIGH EFFICIENCY NONLINEAR OPTICAL APPLICATIONS

RELATED APPLICATIONS

This is a continuation in part of our U.S. patent applications Ser. Nos. 165,290, now U.S. Pat. No. 5,510,929, and Ser. No. 165,291, now U.S. Pat. No. 5,504,615, both filed Dec. 13, 1993.

BACKGROUND OF THE INVENTION

The invention relates to crystals having optical properties suitable for use in optical applications, such as harmonic generators, optical parametric oscillators and acousto-optical devices.

When light enters a linear crystal its electric field generates a polarization in the crystal by displacing positive charges in one direction and negative charges in the opposite direction. The bound charges follow the applied field, accelerating and moving in syncrhronism with it, and thus reradiate a light ray similar in direction and frequency to the incident ray.

In linear optical crystals the displacement of the charges is the same for the two opposing directions of the field, but in nonlinear optical crystals, as a result of the crystal structure, the displacement is greater for a field in one direction than in the opposite direction. As a result of the asymmetric motion, the bound charges in nonlinear crystals generate a reradiated wave which is not identical to the driving wave in that it contains small admixtures of higher harmonics of the incident wave, the second harmonic being of particular interest. The efficiency of conversion of the second harmonic depends on the magnitude of the nonlinear optical susceptibility, which is related to the crystal composition and structure, and on the volume of the crystal which is effective in acting as a coherent generator of the second harmonic wave.

In the simplest case, the volume is limited by the fact that due to normal dispersion of the refractive indices of the material, the second harmonic ray propagates more slowly through the crystal than does the fundamental ray. As a result, at a given point in the crystal the harmonic ray derived from the fundamental in say, the first part of the crystal may be out of phase with that derived from the fundamental in a succeeding part of the crystal, resulting in destructive interference of the generated second harmonic wave, and severe limiting of the effective volume for coherent generation of the second harmonic.

In birefringent nonlinear crystals, however, the problem can be overcome by taking advantage of the fact that in such a crystal, there are different effective light propagation velocities, depending on the polarization of the beam and its propagation direction in the crystal. As an example, in a uniaxial negative birefringent crystal an extraordinary ray (i.e. one which is polarized with its E-vector parallel to the crystal c-axis) travels at a faster speed than does the the ordinary ray (i.e. one which is polarized with its E-vector perpendicular to the crystal c-axis.) The difference in speeds increases as the direction of propagation of the extraordinary ray is shifted away from the c-axis and is at a maximum when the extraordinary ray propagation direction is normal to the c-axis. Making use of the fact that through the anisotropic properties of the nonlinear susceptibilities an ordinary fundamental ray generates an extraordinary second harmonic ray, one can increase the speed of the extraordinary second harmonic ray by increasing its angle of propagation to the c-axis until at some angle, known as the "phase-matching angle." θ its speed will equal the speed of the fundamental ray propagating as an ordinary ray. Then the contributions Lo the second harmonic ray from the fundamental radiation in all parts of the fundamental ray will be in phase, and the second harmonic ray output and the conversion efficiency will be optimized.

In U.S. Pat. No. 3,792,287 Roland and Feichtner disclose a compound of the formula Tl$_3$AsSe$_3$ made into large optically useful crystals which are birefringement and display nonlinear optical properties in the infrared. They teach that such a crystal can be used in a harmonic generator, an optical parametric oscillator and an optical frequency upconverter. The performance of such a crystal for frequency conversion requires good optical quality, polishing characteristics and mechanical properties. However, the Tl$_3$AsSe$_3$ crystal is relatively very soft and has been difficult to polish and handle. Furthermore, the crystal has not been useful for converting light in the mid-infrared light region.

Roland et al. disclose a crystal of Tl$_3$AsS$_4$ for use in acousto-optical systems in U.S. Pat. No. 3,915,556. This crystal is not a nonlinear crystal and is not suitable for converting light in the mid-infrared light region.

There is a great need for an efficient infrared light source than can operate in the mid-infrared wavelength region. Because there are no efficient light sources in this range, the most practical way to accomplish this goal is to use nonlinear crystals to downshift (using optical parametric oscillation) the output of lasers operating at 1 or 2 μm, or upshift (using second harmonic and higher harmonic generation) the output of the CO$_2$ laser at 10 μm. The main obstacle to more widespread use of optical parametric oscillation has been the difficulty in growing large, high quality nonlinear crystals with a combination of high nonlinear coefficients and optical and mechanical parameters compatible with high average power operation. The ideal requirements for nonlinear optical materials are very difficult to meet in a single material. Optical homogeneity, laser damage threshold, stability of the compound upon exposure to a laser beam, and ease of fabrication are main concerns. Improved mechanical properties with respect to cutting and polishing will contribute to increasing the surface damage threshold. Another concern for crystal growers is to scale up the crystal size to achieve high efficiency and high power output without sacrificing the optical quality.

SUMMARY OF THE INVENTION

We have found that Tl$_3$AsS$_3$ can be grown in large optically useful crystals. These crystals have very good nonlinear optical efficiency, higher damage threshold, good mechanical characteristics and mechanical fabricability. These crystals are useful nonlinear harmonic generators and optical parametric oscillators. They can be used with lasers for wavelength conversion within the 0.8 to 9 micrometer region. In addition, they are also suitable for use in linear optical applications, such as acousto-optical devices.

This invention also encompasses methods of making such crystals and using such crystals in both linear and nonlinear optical devices.

DESCRIPTION OF THE PREFERRED EMBODIMENTS

Figure 1:
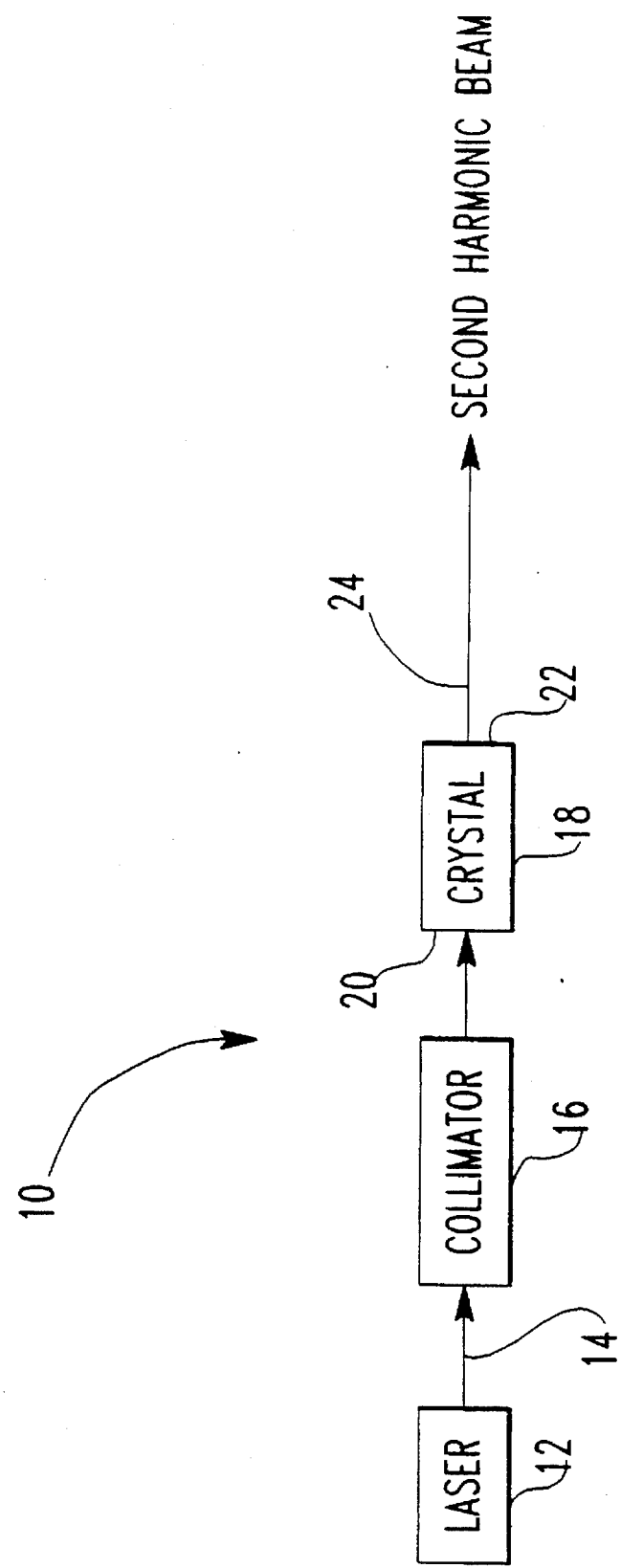
FIG. 1 is a diagram for second harmonic generator using crystals of the present invention.

The harmonic conversion efficiency e in the presence of depletion of a pump beam such as a laser beam is given as:

$$e = [\{2m_o^{3/2} e_o^{1/2} (w^2/n^3) d^2 L^2 I\}^{1/2}] \quad (1)$$

where L is the crystal length, I is the pump intensity, d is effective nonlinear coefficient, and n is the refractive index. Equation (1) is valid as long as losses caused by the conversion process itself can be ignored. Thus, the conversion efficiency is proportional to the pump intensity. However, because of the limitation of radiation power damage and conversion efficiency which the crystal can deliver, it is necessary to grow greater lengths of crystals to achieve higher power levels.

For an optical parametric oscillation system, the gain G is given by the equation:

$$G = \frac{8\Pi C^2 \cdot |d|^2 \cdot 377^3 \cdot L^2 \cdot P}{\lambda_s \lambda_i \cdot n^3 \cdot A} \quad (2)$$

where $\lambda_i$ and $\lambda_s$ are idler and signal wavelength, c is the speed of light, $377^3$ comes from the impedance factor and P/A is power factor per unit area (P is the power and depends on damage threshold, A is the area). The biggest challenge is to grow a large crystal with large nonlinear coefficient, good homogeneity, high laser damage threshold and good mechanical fabricability. We provide a crystal formed of $Tl_3AsS_3$ to enhance the nonlinear optical efficiency and laser damage threshold. This invention provides a novel approach and novel class of very efficient crystals suitable for the second, third and higher order frequency conversion and optical parametric oscillators, as well as acousto-optic applications.

A. Crystal Growth And Characterization

The crystal growth of $Tl_3AsS_3$ involves the preparation and mixture of elements Tl, As and S, and growth of a crystal. The thallium arsenic sulfide mixture is prepared by mixing the purified parent elements in stoichiometric composition. The mixture is then evacuated in a well cleaned quartz tube and homogenized by melting and maintaining it in the molten state for several hours. The mixture is then cooled. The solidified ingot is removed from the quartz tube, and placed in a well cleaned Bridgman growth tube. We used a capillary tube for seeding the crystal. We prefer that the crystal growth be carried out in a two zone vertical furnace. The top zone of the furnace preferably was maintained at 550° C. and the cold zone is maintained at 150° C. We prefer to grow our crystals at the thermal gradient of 30° K/cm using a growth speed of 1 cm/day.

The crystals of this invention are hexagonal, birefringent, anisotropic and have good mechanical fabricability. The crystal has a sharp melting point at 326° C. The crystal class was confirmed by the X-ray diffraction and crystals were oriented by X-ray Laue method. Our crystals have hexagonal symmetry. The crystals we have made have lengths of the a and c axes of 6.99 A and 9.57 A, respectively. The acoustic velocity of our crystal was measured by cutting and polishing a 1 cm³ cube crystal. The crystal was optically polished on all the faces for evaluation. We found that our crystal transmitted light beams of between 0.9 to 10 micrometer wavelength without any absorption band. A lithium niobate crystal was used as transducer. The crystal was bonded to the transducer by UV cure cement. The ratio of the acoustic velocities in the longitudinal and slow shear direction was identical to that of thallium arsenic selenide, a popular acousto-optic material. The slow shear velocity of $Tl_3AsS_3$ crystal is $1.18 \times 10^5$ cm/s. This velocity translates into a very favorable acousto-optic figure of merit.

Based upon this data it is apparent that this crystal can be used interchangeably with the thallium arsenic selenide crystals of the prior art. Yet, our crystal is easier to fabricate and can operate in the near infrared, beyond the cut-off wavelength of thallium arsenic selenide crystals. Furthermore, our $Tl_3AsS_3$ crystal should show very good characteristics for the second harmonic and the higher harmonic generation of optical parametric oscillation applications also by virtue of its nonlinearity, fabricability and potentially higher damage threshold.

EXAMPLE I

The following example further illustrates this invention. As supplied thallium and sulfur were purified in our laboratory. Thallium, arsenic and selenium were weighed in 3:1:3 stoichiometric ratio. The exact weight for the thallium, arsenic and selenium for was 101.5, 12.4 and 15.9 grams respectively. The materials were placed in a well cleaned quartz tube, evacuated and sealed. The elements were reacted by placing the tube well above 700° C. for several hours. The reacted charge was then cooled and placed in a 11×13 mm diameter tube and the crystal was grown in a Bridgman geometry. The nucleation was started by a 2 mm diameter capillary tube.

The growth tube was passed through the temperature gradient at the rate of 1 cm/day. After the crystal growth was completed, the crystal was taken out of the quartz tube by dissolving the tube in hydrofluoric acid. The crystal was cut, polished in the 1 cm³ dimension and its properties were examined for acousto-optic devices.

An acoustic-optic turnable filter was fabricated to prove the proof of concept in the following manner. The $Tl_3AsS_3$ crystal was cut and optically polished. A one centimeter cube was fabricated in b, c and a planes. A lithium niobate transducer was used to generate RF frequency. The slow shear velocity of the material was $1.18 \times 10^5$ cm/s. The filter showed good performance because of its favorable properties needed for acoustic-optic devices.

Our crystals have much better cutting and polishing characteristics than $Tl_3AsSe_3$ crystals. Crystal chipping and pullouts were observed in $Tl_3AsSe_3$ when optical polishing was attempted by 0.1 μm size diamond particles. The scratches were very common and it was extremely difficult to remove the scratches from the optically polished surfaces. In contrast, the crystals of this invention have much improved polishing behavior.

EXAMPLE II

A second thallium arsenic sulfide mixture was prepared by mixing purified Al, As and S in stoichiometric ratio. Purification methods for the elements have been developed in the laboratory. The mixture was evacuated in a well cleaned quartz tube and was homogenized after evacuating. The mixture was gradually heated in a furnace to melt the mixture and was maintained in molten state for several hours. The mixture was cooled after ensuring the complete homogenization. The solidified ingot was carefully taken out of the quartz tube and great care was taken to avoid contamination.

The $Tl_3AsS_3$ ingot was placed in a well cleaned Bridgman growth tube. We used a capillary technique for nucleation. A preoriented seed for growing crystals of desired orientation can be also used. The crystal growth was carried out in a two zone vertical furnace. The top zone of the furnace was maintained above 550 C. and the cold zone was maintained at 150 C. The crystal was grown at the thermal gradient of 30 K/cm and the growth speed was 2 cm/day.

The as-grown crystal was cut by string saw and was optically polished for evaluation. The crystal transmitted between 0.8 to 9.0 µ without any absorption band. The crystal showed an excellent fabricability and optical quality was excellent. Nonlinear optical evaluation was carried out by a 4.8 micrometer laser beam. This 4.8 µm beam was generated by using a TAS second harmonic generator and a 9.6 µm laser wavelength. The crystal generated a sharp and very high intensity signal of 2.4 µ wavelength.

HARMONIC GENERATOR

In a harmonic generator a beam of coherent light of a fundamental wavelength is directed at the crystal at the phase-matching angle for the generation of the desired harmonic. The phase-matching angle will depend upon the wavelength of the fundamental, but may be easily determined experimentally by orienting the crystal until the harmonic is detected. Since conversion efficiency is proportional to power density, the fundamental is preferably focused near the center of the crystal to maximize conversion efficiency and since usually the ordinary polarization of the fundamental generates the harmonic, the fundamental is preferably an ordinary ray. As with all optical devices the input and output rays must be within the transparency region of the crystal.

FIG. 1 illustrates an example of harmonic generator 10 according to this invention. A laser 12 generates a coherent beam of light 14 at the fundamental wavelength which is focused by collimator 16 an the center of crystal 18 which has two polished faces 20 and 22. The crystal 18 may be rhombohedral. The beam 14 is normal to face 20 is cut with its normal at the phase-matched angle θ to the c-axis of the crystal. A second harmonic beam 24 leaves face 22 with the fundamental ray. Additional lenses and reflectors (not shown) can be provided to direct this beam to a desired location.

OPTICAL PARAMETRIC OSCILLATOR

While the only quantitative output of a harmonic generator is the second harmonic or fourth harmonic, an optical parametric oscillator can theoretically generate any frequency lower than the fundamental (within the transparent region of the crystal). In one version of an optical parametric oscillator a coherent extraordinary fundamental ray generates a coherent ordinary signal ray and a coherent ordinary idler ray, the sum of the frequencies of the signal and idler rays equaling the frequency of the fundamental ray. Either of the two output rays may be designated as the "signal" ray for the purposes of this invention. All three rays must be within the transparency region of the crystal. The fundamental ray is preferably an extraordinary ray and is preferably focused at the center of the crystal to maximize conversion efficiency. The angle of the fundamental ray in the crystal to the c-axis (the "phase-matching angle") determines the wavelength of the signal and idler rays.

Figure 2:
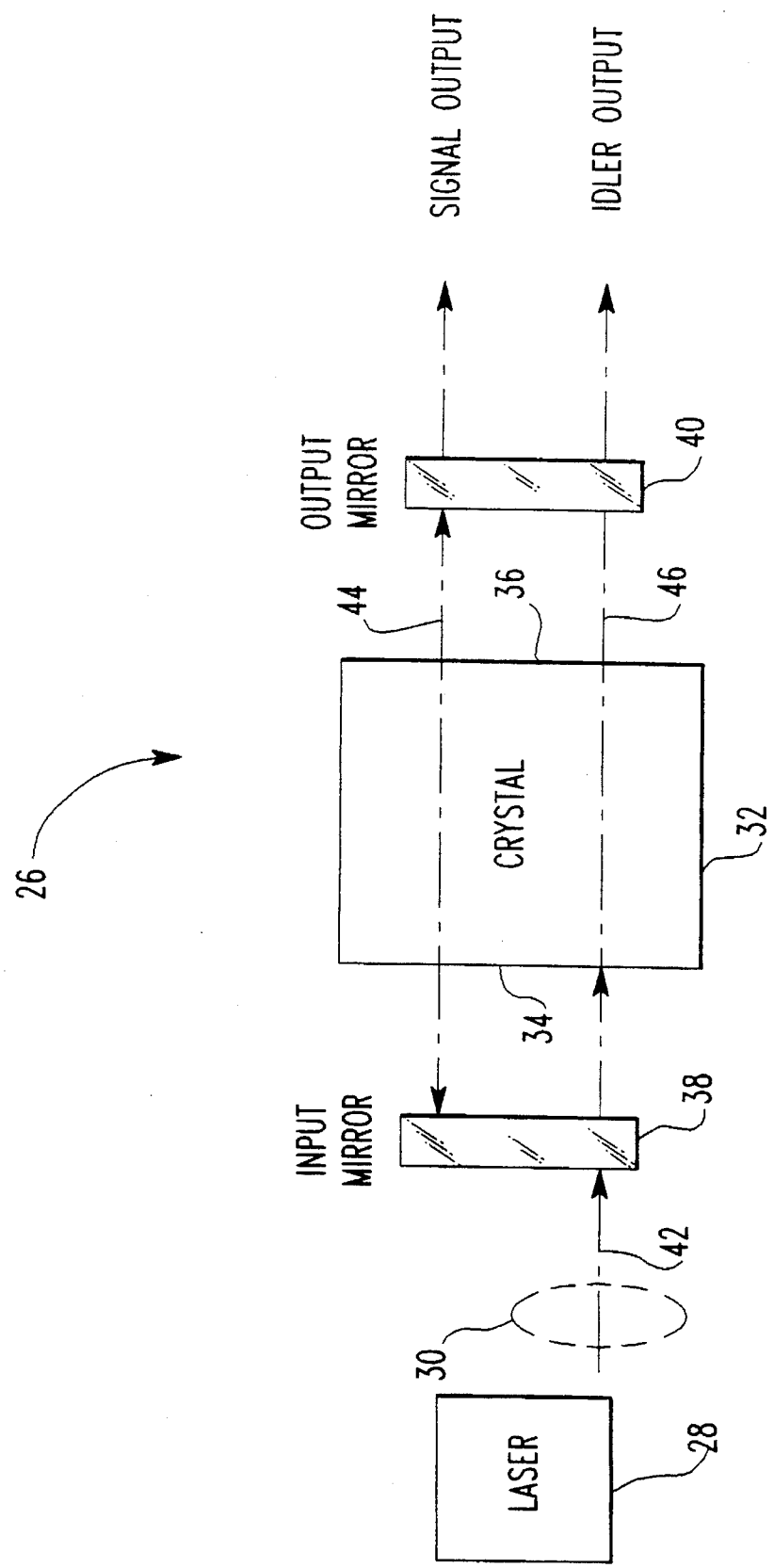
FIG. 2 is a diagram showing an optical parametric system using crystals of the present invention.

FIG. 2 illustrates an optical parametric oscillator 26 in an external configuration according to this invention. A laser 28 generates a fundamental ray which is focused by an optional lens 30 into the center of crystal 32 having polished faces 34 and 36. Crystal 32 may rhombohedral. Opposite the ends of crystal 32 are mirrors 38 and 40, the common optical axis of which is parallel to the fundamental ray in the crystal. These mirrors may be deposited directly on the crystal but this is not preferred. One of the mirrors 38 is reflective at the wavelength of the signal ray and the other mirror 40 is partially reflective of the wavelength of the signal ray. As indicated by arrow 42 a laser 28 inputs a beam through input mirror 38 to produce a signal output 44 and idler output 46.

ACOUSTO-OPTICAL APPLICATIONS

The solid solution crystals of this invention can also be used in a variety of acousto-optical devices such as those described in our pending U.S. patent application Ser. No. 165,291. Such devices include RF spectrum analyzers, two dimensional laser beam scanners, display devices, laser modulators, tunable filters and acoustic delay lines.

Figure 3:
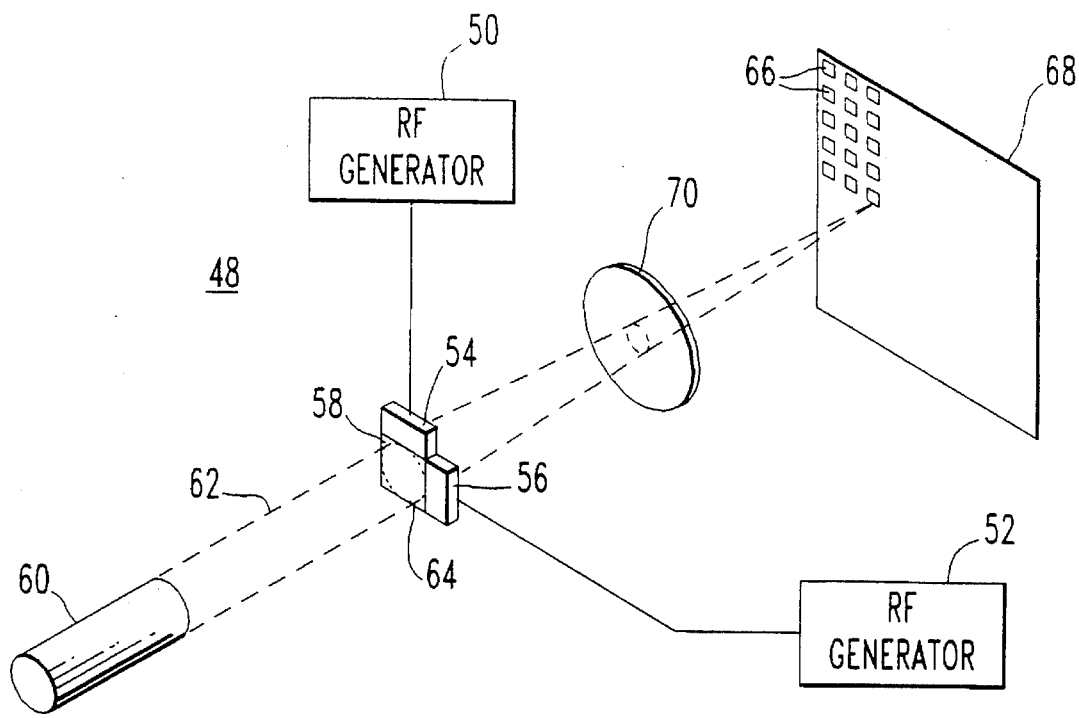
FIG. 3 is an isometric diagrammatic drawing of a display device using the crystals of this invention.

FIG. 3 is an isometric diagram of a display device 48 using the crystals of this invention. Radio frequency generators 50 and 52 send RF signals to transducers 54 and 56 respectively, which respectively generate vertically moving and horizontally moving sound waves in the solid solution crystal 58, preferably in the Bragg mode so that there is only one diffraction beam. The light, which is preferably collimated, is obtained from a laser 60 which generates a coherent beam of light 62 having a wavelength in the range of about 1.3 to 17 µm and being directed to one of two parallel optical faces 64 at crystal 58. Light passing through crystal 58 is directed at various spots 66 on viewing screens 68 by means of vertically and horizontally moving sound waves generated by transducers 54 and 56. Lens 70 focuses the light at the spots.

The illuminated spots may each be at a page of information which is then optically enlarged and projected on a second viewing screen (not shown). The illuminated spots could also in themselves form a pattern. In either case, visible or infrared light could be used. In the infrared case, for example, viewing screen 68 could be a phosphor coated screen such as zinc sulfide doped with lead and copper and flooded with UV light and the successive illumination of selected spots would form a picture similar to a television picture. Also, in the infrared, the viewing screen could be an infrared or thermally quenched UV excited phosphor screen where ultraviolet light causes the entire screen to be illuminated, but each selected spot successively struck by the beam from crystal 58 is darkened to form a picture on the screen.

Figure 4:
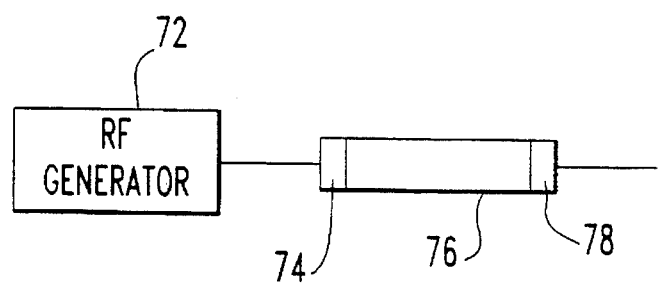
FIG. 4 is a diagrammatic drawing of an acoustic delay line using the crystals of this invention.

This invention also encompasses an acoustic delay line which causes an electrical signal to be delayed for a length of time required for an acoustic signal to traverse the crystal. Unlike many other methods of delaying an electrical signal an acoustic delay line is non-dispersive. FIG. 4 is a diagram of an acoustic delay line using the crystals of this invention. In FIG. 4, RF generator 72 provides the electrical signal to be delayed. This signal is electrically transmitted to transducer 74 which converts the signal to an acoustic wave which is propagated through the sold solution crystal 76. At the other end of the crystal, transducer 78 detects the acoustic wave and converts it into an electrical signal.

Although we have described and illustrated certain preferred embodiments of our invention, it should be understood that the invention is not limited thereto but may be variously embodied within the scope of the following claims.

We claim:

1. A crystal having nonlinear optical properties and improved cutting and polishing characteristics comprised of $Tl_3AsS_3$ said crystal being transmissive to mid-infrared wavelength region light.

2. The crystal of claim 1, wherein said crystal is rhombohedral.

3. The crystal of claim 1 having a size sufficiently large to enable the crystal to be used in at least one of an optical nonlinear device, an optical parametric oscillator and an acousto-optical system.

4. The crystal of claim 3 cut, optically polished and free of cracks.

5. The crystal of claim 1 cut, optically polished and free of cracks.

6. The crystal of claim 1 which is transmissive to light having wavelengths in the region of 0.8 to 9.0 microns without any absorption band in that region.

* * * * *